Oct. 3, 1961 A. A. THIELE 3,003,108
REBALANCE BRIDGE
Filed Sept. 16, 1957 2 Sheets-Sheet 1

INVENTOR.
Alfred A. Thiele

Oct. 3, 1961     A. A. THIELE     3,003,108
REBALANCE BRIDGE

Filed Sept. 16, 1957     2 Sheets—Sheet 2

INVENTOR.
Alfred A. Thiele

_United States Patent Office_

3,003,108
Patented Oct. 3, 1961

3,003,108
REBALANCE BRIDGE
Alfred A. Thiele, 2502 Brighton Drive, Louisville 5, Ky.
Filed Sept. 16, 1957, Ser. No. 684,376
6 Claims. (Cl. 324—140)

This invention relates to a rebalancing bridge circuit employing semiconductors in the complementary symmetry configuration and including a total amplitude sensing device.

One object of the invention is to produce a circuit which will give an output which is proportional to the difference of the ratio of a pair of inputs thereto and the impedance ratio of a voltage divider comprising a variably tapped resistor and at the same time give a signal upon the failure of the inputs and/or an output which is proportional to the sum of the amplitudes of the two signals.

Other objects of this invention are to provide a rebalance bridge and total amplitude sensing device which has a minimum size, minimum of components, low heat dissipation, gain, temperature drift cancellation, and good frequency response.

Another object of this invention is to provide a circuit which can be used as a rebalance measuring device with a failure indication device.

Another object of my invention is to provide a true proportional control system which responds to a variable frequency signal and at the same time receives amplitude and/or pulse modulation of the variable frequency signal.

Figure 1:
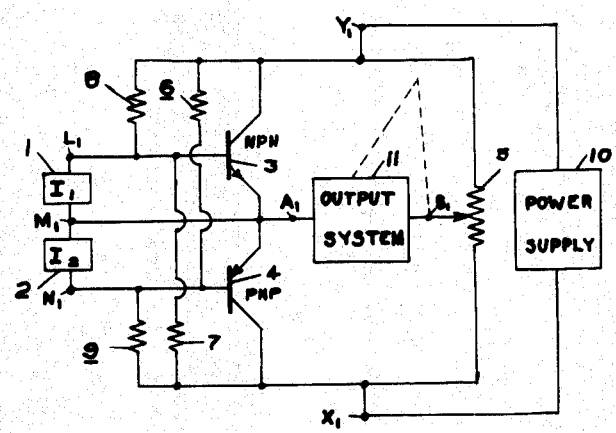
Figure 2:
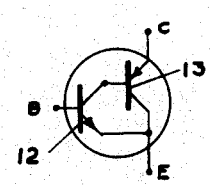
Figure 3:
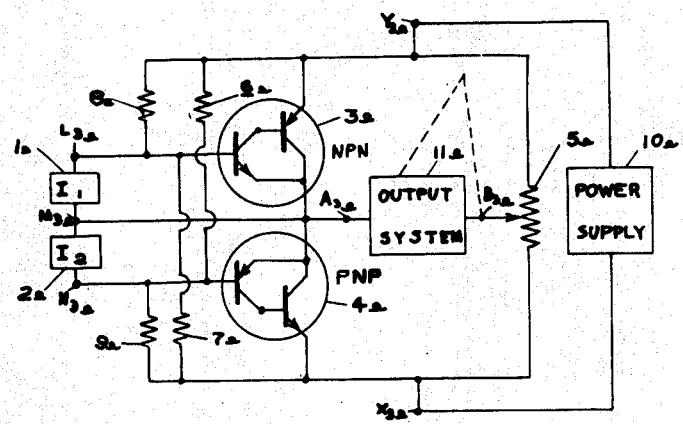
Figure 4:
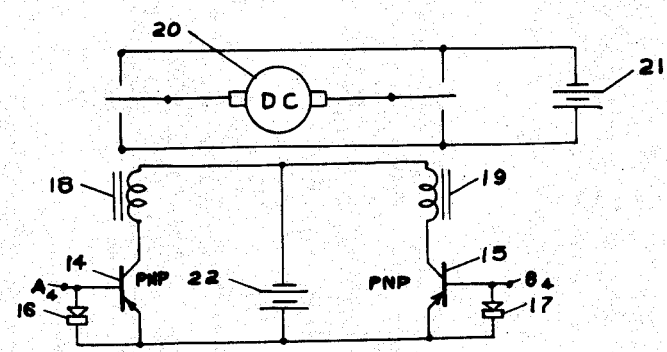
Figure 5:
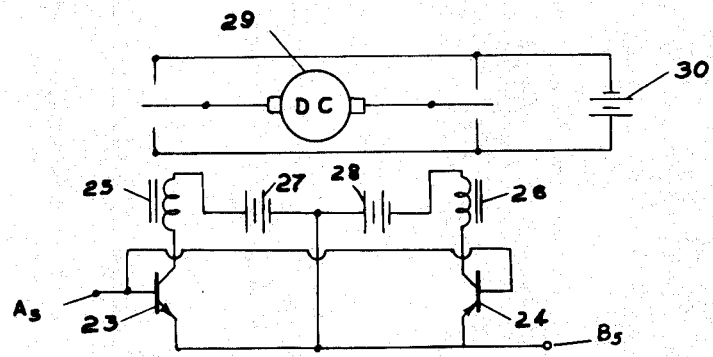
Figure 6:
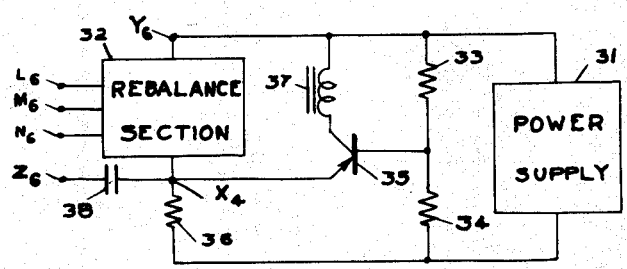
Figure 7:
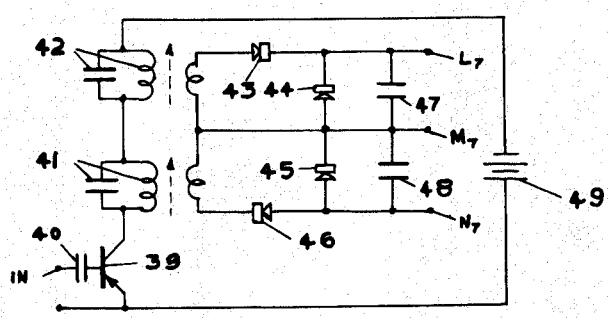

Other and further objects of this invention will become apparent in the following description and accompanying drawings wherein: FIG. 1 is a diagram of the rebalance circuit. When later reference is made to the rebalance bridge it refers to the part of the circuit included by points $L_1$, $M_1$, $N_1$, $X_1$, and $Y_1$. FIG. 2 is an equivalent transistor made of two transistors. FIG. 3 is the same as FIG. 1 except that the compound transistor of FIGURE 2 has been substituted for the single transistors. FIG. 4 is a power control circuit for translating the output of the rebalance bridge into motor shaft rotation. FIG. 5 is another embodiment of the device shown in FIG. 4. FIG. 6 shows a device for detecting an absence of signal to the rebalance bridge and detecting audio signals. FIG. 7 shows a sample input device.

In FIG. 1: $L_1$, $M_1$, and $N_1$ are the input terminals. Block 1 represents an input $I_1$. Block 2 represents the other input $I_2$. These inputs must be D.C. of the correct polarity for the inputs of the transistors, 3 and 4. One of these transistors is the PNP type and the other is the NPN type. The circuit is symmetrical and the orientation of the transistors is determined by the polarity of the voltage at points $X_1$ and $Y_1$. An input to either or both of the transistors lowers the effective D.C. resistance of the transistor or transistors, respectively. If the ratio of the effective resistance of the transistors is not the same as the ratio of the resistance of the sections on opposite sides of the variable tap of the resistor 5 there appears a voltage across points $A_1$ and $B_1$. The output system 11 connected between points $A_1$ and $B_1$ is so constructed that a voltage in one direction results in a movement of the variable tap of the resistor 5 in one direction. A voltage in the other direction causes a movement in the other direction. The circuit as so far described would cause the output to follow the input if it were not for the high A.C. collector resistance of the transistors. This causes the effective D.C. resistance to lower with a decrease in voltage. This lowering of effective resistance with a decrease in voltage causes instability. This instability is overcome by the cross degeneration resistors 6 and 7. These two resistors permit each transistor to degenerate the other. With this degeneration a change in collector voltage causes a change in collector current and the transistors act as base controlled variable resistors. With the addition of these resistors the output device now follows the ratio of the input signals. The addition of resistors 8 and 9 causes the output device to return to a point which is the inverse of their ratio in the absence of an input. This is because the resistors provide a current which simulates an input. 10 is the power supply for this circuit.

An example of suitable operating values for the circuit parameters of FIG. 1 is as follows:

Transistors:
  3 _____ 2N35
  4 _____ 2N34
Resistors:
  5 _____ 5K
  6 _____ 22K
  7 _____ 22K
  8 _____ meg__ 1.5
  9 _____ meg__ 1.5

FIG. 2 shows a transistor equivalent which may be substituted for the transistors in the rebalance circuit. This particular circuit consists of two common emitter connected transistors 12 and 13 which are direct coupled. If one of these transistors is of the NPN type the other must be of the PNP type. The equivalent base B equivalent collector C, and equivalent emitter E to a single transistor are indicated. Other equivalent transistors are found in Patent No. 2,663,806 by S. Darlington.

FIG. 3 is the same as FIG. 1 except the equivalent transistor of FIG. 2 is substituted for the transistors. The numbers are the same except for the subletter $e$. The operation is the same.

FIG. 4 is an output device for converting the output at points $A_1$ and $B_1$ into shaft rotations. 14 and 15 are transistors. 16 and 17 are diodes. 18 and 19 are motor control relays. 20 is a D.C. motor. 21 is the motor power supply. 22 is the relay power supply. The transistors are of the same type. When a voltage is placed across points $A_4$ and $B_4$, the points $A_4$ and $B_4$ corresponding to the output points $A_1$ and $B_1$, respectively, of FIG. 1, the voltage on the input of one transistor is of the wrong polarity to conduct. It is bypassed by a diode. The current then flows from the diode through the input of the other transistor. Thus according to the polarity of the voltage across points $A_4$ and $B_4$ one or the other of the transistors conducts. The corresponding relay then closes and the motor turns until the bridge is rebalanced. There is a mechanical connection from the output to the resistor 5, as shown by the phantom linkage displayed in FIG. 1.

FIG. 5 is an alternate device for converting the voltage at points $A_1$ and $B_1$ into shaft rotations. In this figure, 23 and 24 are transistors of the opposite polarities. 25 and 26 are motor control relays which are controlled by the transistors. 27 and 28 are the power supplies for each transistor. 29 is the motor and 30 is the motor power supply. The points $A_1$ and $B_1$ as shown in FIG. 1, are hereinafter referred to as $A_5$ and $B_5$, respectively. When a voltage is placed across points $A_5$ and $B_5$ it will cause one transistor to conduct but not the other according to the polarity of the transistor and voltage. This is because transistors of opposite polarities such as NPN and PNP require input voltages of opposite respective polarity to render them conductive. This closes the corresponding relay, turns the motor and rebalances the bridge.

The output device at points $A_1$ and $B_1$ may be any other type of differential relay or magnetic amplifier operating electrical, hydraulic, or pneumatic devices.

In FIG. 6 is given the part of the circuit which detects input failures and amplitude modulation of the input signals. 31 is the power supply. 32 is the circuit of FIG. 1 or FIG. 3. Resistors 33 and 34 form a voltage divider which presents a constant voltage to the base of transistor 35 with reference to the power supply. In the rebalance section the resistor 5 draws a nearly constant current. The transistors 3 and 4 draw a current which is proportional to the strength of the input signals from the sources $I_1$ and $I_2$. The resistor 36 conducts the sum of these two currents. The value of 36 and the voltage at the base of tranisstor 35 are chosen so that when an input signal is being received the emitter of the transistor 35 receives a D.C. signal of the wrong polarity and is cut off. If, however, the signal is removed the current through 36 drops. The voltage across 36 drops and the emitter of the transistor 35 receives a D.C. signal in the forward direction and it conducts throwing relay 37. Thus by interrupting the input signal pulses may be sent to relay 37. If the input signal is amplitude modulated the audio signal may be picked up at point $Z_6$ through capacitor 38. This signal results from the current variation through 36.

An example of suitable operating values for the circuit parameters of FIG. 6 is as follows:

Transistor 35 _____ CK721
Resistors:
    33 _____ 40K
    34 _____ 10K
    36 _____ 0.5K
Capacitor 38 _____ μf 0.1
Relay 37 _____ 5K FIG. 7 is a diagram of a discriminator input to points $L_7$, $M_7$, and $N_7$ of the rebalance circuit. The points $L_7$, $M_7$ and $N_7$ shown in FIG. 7 correspond to the input terminals $L_1$, $M_1$ and $N_1$, respectively, as shown in FIG. 1. This is given so that typical remote control operation can be described. 39 is an input transistor amplifier. 40 is the input coupling capacitor to 39. 41 and 42 are tuned transformers tuned to two intermediate frequencies, 255 and 265 kc. The signals from the transformers are rectified in diodes 43, 44, 45 and 46. The rectified signal is smoothed in capacitors 47 and 48. The power supply is 49.

An example of suitable operating values for the circuit parameters of FIG. 7 is as follows:

Transistor 39 _____ 2N35
Tank circuits: _____
    41 _____ kc 255
    42 _____ kc 265
Capacitor 40 _____ μf 0.01
Diode rectifiers 43–46 _____ 1N34

*Operation*

The embodiment shown in FIG. 1 may be used as a measuring device in the following manner.

The direct current source $I_1$ is held at a fixed value and a transducer such as a thermocouple is substituted for the direct current source $I_2$. The transducer is so connected that its voltage response as seen by the transistor 4 is of opposite polarity from that of the current source $I_1$ as seen by the transistor 3.

When the transducer responds to some measurable quantity, the resulting current output lowers the effective D.C. resistance of the transistor 4 by a proportional amount. At the same time, the effective D.C. resistance of the transistor 3 is lowered in proportion to the constant current value of the direct current source $I_1$ which acts as a standard reference value for the rebalance bridge.

Thus, a ratio is effected between the resistance values of the transistors 3 and 4 respectively.

The resistance ratio of the two transistors must equal the ratio of the sections of the variably tapped resistor 5 in order for the bridge to be balanced. If the ratios are not equal, a voltage of magnitude and polarity proportional to the difference between the two ratios appears across the terminals $A_1$ and $B_1$ of the output system 11.

The output system 11 responds to the unbalance voltage across its terminals $A_1$ and $B_1$ and acts to mechanically adjust the values of the sections of the variably tapped resistor 5 until the voltage across terminals $A_1$ and $B_1$ is equal to zero or an equivalent null value. The final value of the resistance ratio and the known reference output of the current source $I_1$ determines the value of the unknown quantity being measured.

The operation of FIG. 3 is the same as that of FIG. 1 with the transistor units of FIG. 2 properly substituted for the transistor units of FIG. 1.

In FIG. 4, the terminals $A_4$ and $B_4$ correspond to the terminals $A_1$ and $B_1$, respectively, of the output system 11 as shown in FIG. 1. An unbalance voltage across $A_4$ and $B_4$, depending upon its polarity, causes one of the transistors 14 or 15 to conduct and energize its associated relay 18 and 19, respectively. The D.C. motor 20 is energized for proper directional rotation to adjust the variably tapped resistor 5 (FIG. 1) by a means not shown. The motor is stopped when the unbalance voltage across $A_4$ and $B_4$ is brought to a null.

The operation of FIG. 5 is similar to that of FIG. 4, the difference residing in the types of transistors used and the resulting circuitry required.

For operation as a remote control the circuits of FIGS. 1, 6 and 7 are interconnected as shown by the corresponding letters. A 20% audio modulated tone varying between 255 and 265 kc. is used as the input at $I_2$. When the audio carrier is varied in frequency the ratio of the two inputs at $I_1$ and $I_2$ as detected by the rebalance circuit varies and the circuit rebalances controlling the output system 11. Other information may be transmitted by the audio tone. Brief interruptions of the carrier do not affect operation and may be used to send pulses. The part of the circuit given in FIG. 6 receives these pulses

What is claimed is:

1. A self balancing bridge circuit including first and second direct current source inputs having a common terminal therebetween, said first source providing a standard value of direct current and said second source providing a variable value of direct current in response to a predetermined condition; first and second bridge arms, said first bridge arm comprising a first transistor of a predetermined polarity having the emitter terminal thereof connected to the base terminal thereof through said common terminal and said first source, and said second bridge arm comprising a second transistor of an opposite polarity from said first transistor having the emitter terminal thereof connected to the base terminal thereof through said common terminal and said second source, said transistors each having a collector terminal, said first and second bridge arms extending from said common terminal to the respective collector terminals through said emitter terminals whereby an impedance is provided in each bridge arm by the respective transistor therein having a magnitude proportional to the value of the respective direct current source inputs; third and fourth bridge arms comprising a single fixed resistor connected between said collector terminals of said first and second transistors and having a variable tap intermediate the ends thereof providing a variable common connection between said third and fourth bridge arms, whereby an impedance is provided in each of said third and fourth bridge arms having relative magnitudes dependent upon the position of said variable tap; a power source connected across said collector terminals whereby said first and second bridge arms and said third and fourth bridge arms, respectively, form first and second voltage dividers having said common terminal and said variable tap, respectively, as the intermediate terminals thereof whereby a voltage difference appears between said terminals as a function of the difference in the impedance ratio of said first and second voltage dividers; and unbalance detecting means connected between said common terminal and said variable tap responsive to said voltage difference to automatically reposition said variable tap to a position wherein the impedance ratios of said first and second voltage dividers are equal, including means for providing an indication of the value of said ratio.

2. The device as described in claim 1 wherein said unbalance detector means comprises a pair of common emitter connected transistors of like polarity, a pair of relays connected one in the collector circuit of each transistor and having a common power supply, a pair of input terminals one to each base electrode of said transistors for receiving a voltage input from said common terminal and said variable tap, respectively, a pair of crystal diodes associated one with each of said pair of transistors, and connected from base to emitter thereof, whereby a voltage of improper polarity when applied to one of said transistors is bypassed by the diode associated therewith to allow the other of said pair of transistors to conduct and energize proper relay and a reversible motor in driving relationship with said variable tap and controlled by said pair of relays for adjusting said tap in a direction corresponding to the value of said voltage input.

3. The device as claimed in claim 1 wherein said unbalance detector means comprises a differential relay controlled servo-mechanism for automatically adjusting said variable tap and thereby adjusting the impedance ratio of said single fixed resistor.

4. The device as described in claim 1 wherein said unbalance detector means comprises a pair of common emitter common base connected transistors of opposite polarity, a pair of relays connected one in the collector circuit of each of said transistors, individual power supplies for each of said relays for biasing one of said relays positive and one negative with respect to the common emitter circuit of said pair of transistors, a pair of input terminals arranged one in the common base circuit and one in the common emitter circuit of said transistors for receiving a voltage input from said common terminal and said variable tap, respectively, whereby one of the transistors will conduct and actuate its associated relay in response to a signal of proper polarity across said input terminals, and a reversible motor in driving relationship with said variable tap and controlled by said pair of relays for adjusting said tap in a direction corresponding to the value of said voltage input.

5. In a rebalance bridge device including a plurality of bridge arms comprising first and second variable ratio voltage dividers, said first voltage divider comprising variable impedance means responsive to individual input signals, and a plurality of input signals for said first voltage divider; a device for detecting failure of said input signals to said first voltage divider comprising, a power supply mutually connected across both of said voltage dividers at a pair of terminals common thereto, a dropping resistor connected between one of said terminals and the corresponding terminal on said power supply whereby the total current from both of said voltage dividers flows through said dropping resistor, a transistor connected by its emitter between said dropping resistor and said one of said terminals and by its base to a source of reference potential, and a relay connected between the other of said terminals and the collector of said transistor, whereby upon failure of any of said input signals to said first voltage divider, the input responsive variable impedance means therein cause a decrease in current flow through said first voltage divider reducing the total current flow in said dropping resistor, said decrease in current providing a resultant decrease in voltage drop across said resistor and a corresponding decrease in emitter voltage allowing said reference voltage at the base of said transistor to cause said transistor to conduct and energize said relay as an indication of input failure.

6. The device as described in claim 5 wherein said source of reference voltage comprises a voltage divider connected across the terminals of said power supply.

References Cited in the file of this patent

UNITED STATES PATENTS

| | | |
|---|---|---|
| 2,652,489 | Robinson | Sept. 15, 1953 |
| 2,654,841 | Dutton | Oct. 6, 1953 |
| 2,778,978 | Drew | Jan. 23, 1957 |
| 2,806,207 | Edwards | Sept. 10, 1957 |
| 2,823,351 | Page | Feb. 11, 1958 |
| 2,859,402 | Schaeve | Nov. 4, 1958 |
| 2,860,193 | Lindsay | Nov. 11, 1958 |
| 2,871,348 | Hutchinson et al. | Jan. 27, 1958 |
| 2,882,450 | McCabe | Apr. 14, 1959 |

FOREIGN PATENTS

| | | |
|---|---|---|
| 162,171 | Australia | Jan. 21, 1954 |